(12) United States Patent
Eddings, Jr. et al.

(10) Patent No.: US 9,745,002 B2
(45) Date of Patent: Aug. 29, 2017

(54) MOVABLE PLATFORM SYSTEM FOR PICKUP TRUCK

(71) Applicants: Albert R. Eddings, Jr., El Paso, TX (US); Pete A. Eddings, El Paso, TX (US)

(72) Inventors: Albert R. Eddings, Jr., El Paso, TX (US); Pete A. Eddings, El Paso, TX (US)

( * ) Notice: Subject to any disclaimer, the term of this patent is extended or adjusted under 35 U.S.C. 154(b) by 34 days.

(21) Appl. No.: 14/876,078

(22) Filed: Oct. 6, 2015

(65) Prior Publication Data

US 2017/0096177 A1 Apr. 6, 2017

(51) Int. Cl.
*B62D 33/02* (2006.01)

(52) U.S. Cl.
CPC .................... *B62D 33/0207* (2013.01)

(58) Field of Classification Search
CPC . B62D 33/0207; B62D 33/0273; B60P 1/003; B60P 3/40
USPC ............... 224/403, 281, 510; 296/26.09
See application file for complete search history.

(56) References Cited

U.S. PATENT DOCUMENTS

| | | | |
|---|---|---|---|
| 3,661,431 A * | 5/1972 | Wisecarver | F16C 13/006 16/105 |
| 3,912,139 A * | 10/1975 | Bowman | B60R 9/00 211/22 |
| 4,249,684 A | 2/1981 | Miller et al. | |
| 4,635,992 A | 1/1987 | Hamilton et al. | |
| 5,037,153 A | 8/1991 | Stark | |
| 5,121,959 A * | 6/1992 | King | B60R 9/00 224/310 |
| 5,988,722 A * | 11/1999 | Parri | B60P 1/003 224/403 |
| 6,264,083 B1 * | 7/2001 | Pavlick | B60R 11/06 224/281 |
| 6,283,526 B1 * | 9/2001 | Keough | B60P 1/003 296/183.1 |
| 6,464,274 B2 * | 10/2002 | Mink | B60P 1/003 296/26.09 |
| 6,464,277 B2 * | 10/2002 | Wilding | B60R 9/00 224/404 |
| 6,695,375 B1 | 2/2004 | May | |
| 6,945,580 B1 | 9/2005 | Hentes | |
| 7,159,917 B2 * | 1/2007 | Haaberg | B60P 3/14 224/403 |
| 8,376,438 B1 | 2/2013 | Johnson, Sr. et al. | |
| 8,393,665 B2 | 3/2013 | Villano et al. | |
| 2002/0180231 A1 * | 12/2002 | Fox | B62D 33/0273 296/26.01 |
| 2006/0091689 A1 | 5/2006 | Wilding | |
| 2006/0125267 A1 * | 6/2006 | Stevenson | B60P 1/003 296/26.09 |
| 2006/0145498 A1 * | 7/2006 | Bartos | B60P 1/003 296/26.09 |

* cited by examiner

*Primary Examiner* — Corey Skurdal
(74) *Attorney, Agent, or Firm* — Kinney & Lange, P.A.

(57) ABSTRACT

A movable platform system for a cargo bed of a pickup truck includes left and right parallel rail assemblies mountable in the bed and left and right platform supports carrying a plurality of roller bearings that engage two surfaces on each rail. A platform suspended from both platform supports is slidable between a forward and rearward position on the rail assemblies. A locking mechanism connected to the platform support allows the platform to be secured in a forward and rearward position.

20 Claims, 10 Drawing Sheets

MOVABLE PLATFORM SYSTEM FOR PICKUP TRUCK

BACKGROUND

The present invention relates in general to movable load support assemblies and in particular to the mounting of movable storage units in the cargo bed of a pickup truck.

Conventional storage units for tools and other equipment are typically mounted in the cargo bed of a pickup truck immediately behind the cab. The reason for this is to maximize the storage space in the remainder of the cargo bed for lumber, tools and occasionally camping gear. Toolboxes mounted in this fashion are readily accessible from the side of the truck by operators standing on the ground. On the other hand, the center of the toolbox is not easily accessible from outside the truck. In order to gain access an operator must climb into the cargo bed of the truck. This may be difficult, particularly if the bed is filled with tools, lumber and other materials and may lead to slip and fall injuries.

SUMMARY

A movable platform system for a cargo bed of a pickup truck includes left and right rail assemblies mountable parallel to one another in the cargo bed of the pickup truck, a left platform support carrying a plurality of roller bearings that engage two surfaces of the left rail assembly, and a right platform support carrying a plurality of roller bearings that engage two surfaces of the right rail assembly. A platform is suspended from the left and right platform supports that are slidable on the left and right rail assemblies between a forward position and a rearward position. A locking mechanism connected to the platform support is configured to secure the platform in the forward position and in the rearward position.

DETAILED DESCRIPTION

Figure 1A:
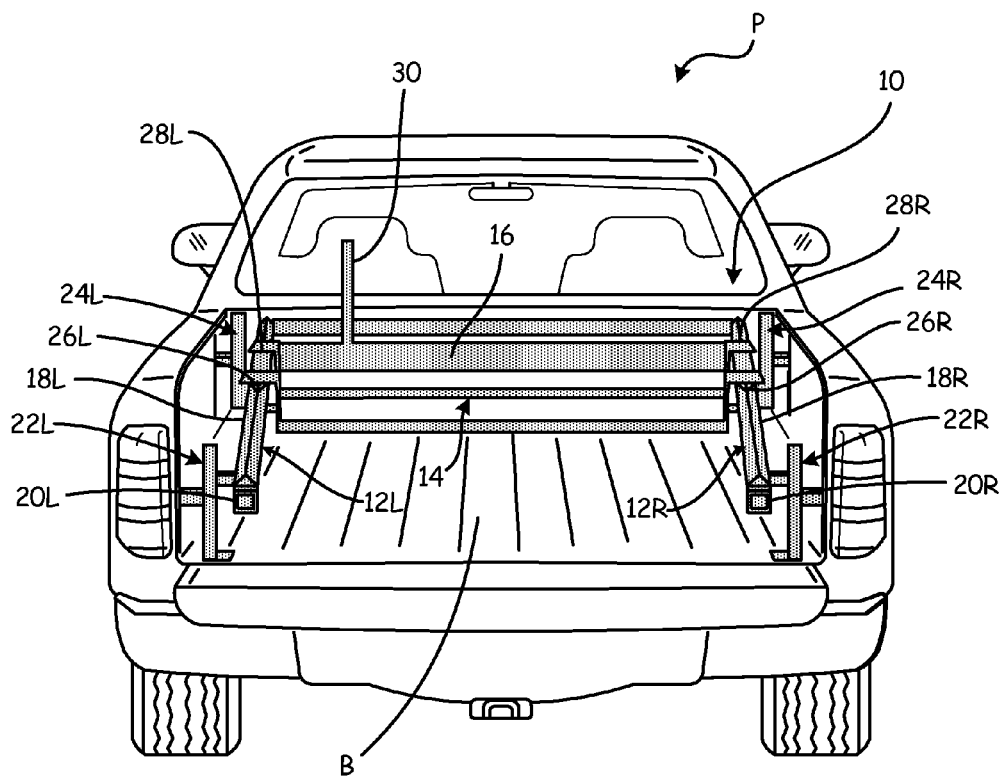
FIG. 1A is a perspective view of a movable platform system of the invention mounted in a truck.
Figure 1B:
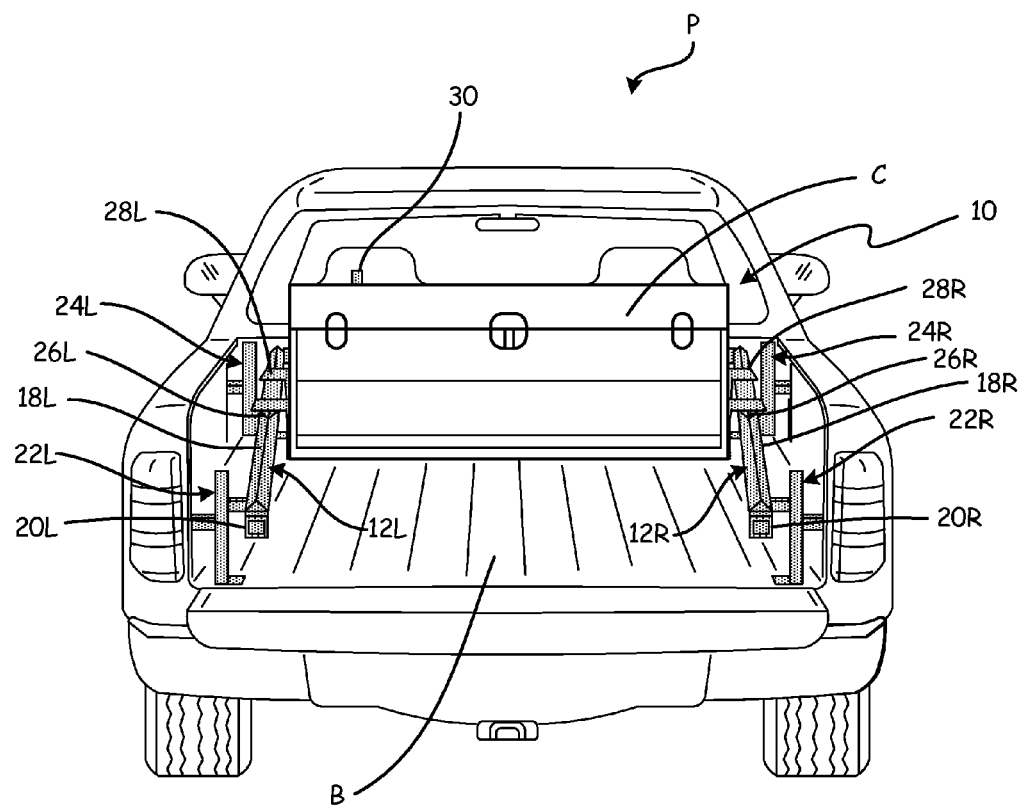
FIG. 1B is a perspective view of the invention with a toolbox mounted on the platform.

A perspective view of movable platform system 10 is shown in FIGS. 1A and 1B. Platform system 10 is mounted in cargo bed B of pickup truck P and allows a storage container C to be positioned forward in bed B for travel and slid to the rear of bed B for access and use. There are three major components of system 10. Rail assembly 12, platform 14, and back plate assembly 16.

Rail assembly 12 is formed by left rail assembly 12L and right rail assembly 12R. Rail assemblies 12L and 12R include upward facing 90° angle rails 18L and 18R on box rails 20L and 20R attached to left side mounting brackets 22L and 24L and right side mounting brackets 22R and 24R, respectively. Brackets 22L and 24L are attached to the left side of cargo bed B of pickup truck P, and brackets 22R and 24R are attached to the right side of cargo bed B.

Platform 14 is a frame that is supported on self-centering bearings 26L and 28L on left rail 12L and on self-centering bearings 26R and 28R on right rail 12R. Platform 14 supports storage container C, as shown in FIG. 1B.

Back plate assembly 16 is attached to platform 14, and includes braking and locking features activated by handle 30. Platform 14, usually holding container C such as a tool box (see FIG. 1B), may be secured in the front of bed B for travel by a self-locking mechanism described later. For use such as at a job site, platform 14 may be released by pulling lever 30 and may be easily moved to the rear of bed B for access. The self-locking mechanism allows platform 14 to be secured at a preselected site or sites in the rear of bed B. Roller bearings 26L and 28L and roller bearings 26R and 28R allow easy positioning of platform 14 on rails 12L and 12R, respectively.

Figure 2:
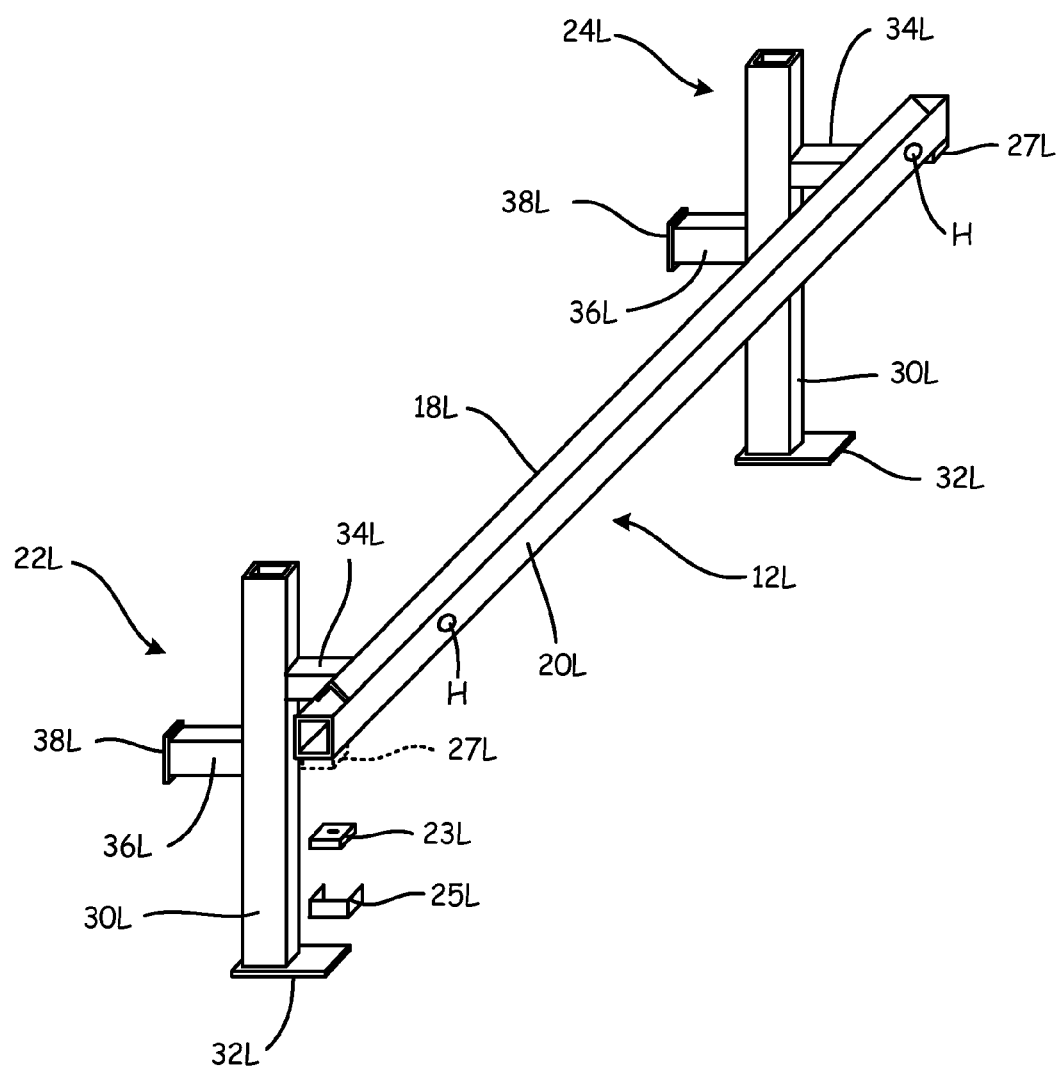
FIG. 2 is a perspective view of the left rail assembly.

Details of the left or driver's side angular contact rail assembly 12L are shown in FIG. 2. Angular contact rail assembly 12L comprises upward facing 90° angle rail 18L attached to box rail 20L, preferably by welding. Left rear support 22L and left front support 24L each comprise riser 30L, bed mounting pad 32L, rail mounting arm 34L, wall mounting arm 36L, and wall mounting pad 38L. Risers 30L are attached to the left side wall of bed B by wall mounting arm 36L and wall mounting arm pad 38L. Risers 30L are attached to the floor of bed B by bed floor pad 32L. Box rail 20L is attached to risers 30L by rail mounting arms 34L. Also shown in FIG. 2 are locking holes H, which are used for locking platform 14 in place. All attachments of the arms to the risers are preferably by welding. Attachments of the mounting pads to the floor and walls of the cargo bed preferably are by mechanical fasteners.

Exploded views of rubber bumper 23L and metal rubber bumper trap 25L form carrier stops 27L on the underside of angular contact rail 12L.

Figure 3:
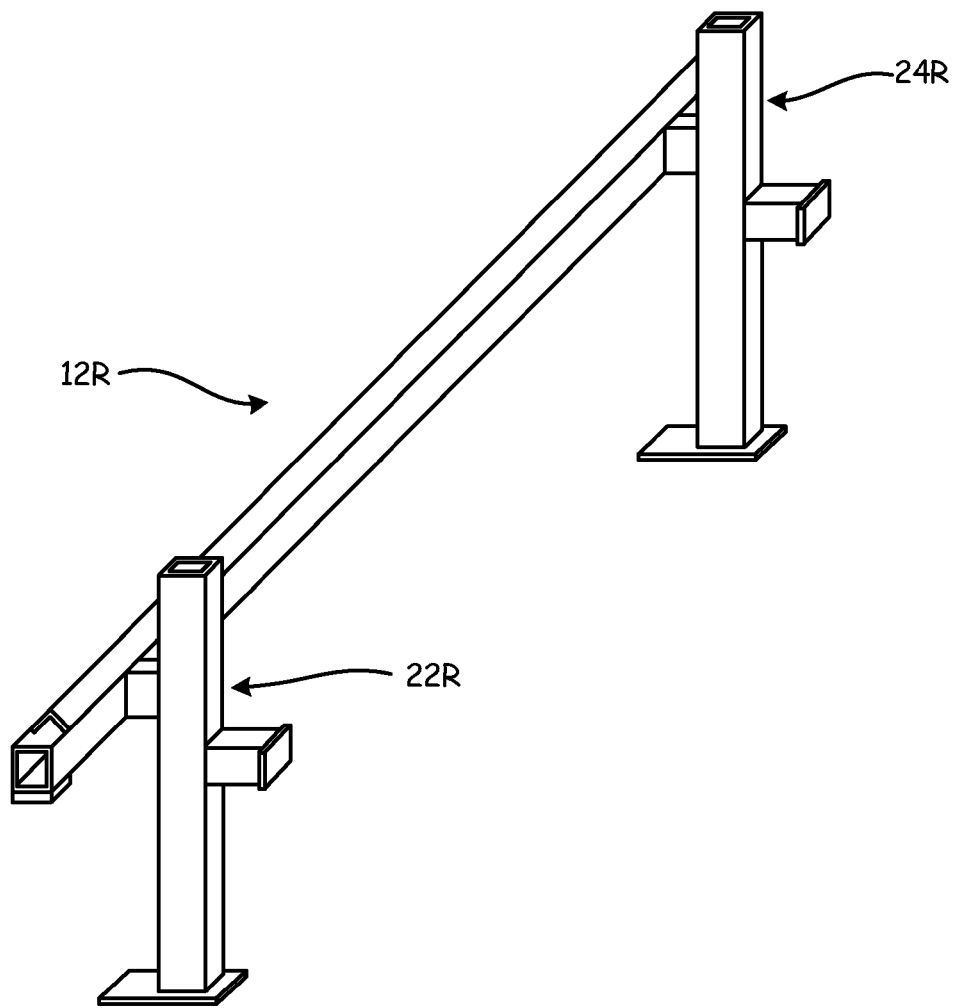
FIG. 3 is a perspective view of the right rail assembly.

Right angular contact rail system 12R, 22R, and 24R is shown in FIG. 3. The components are minor images of and are identical to left angular contact rail system 12L, 22L, and 24L described above.

Figure 4:
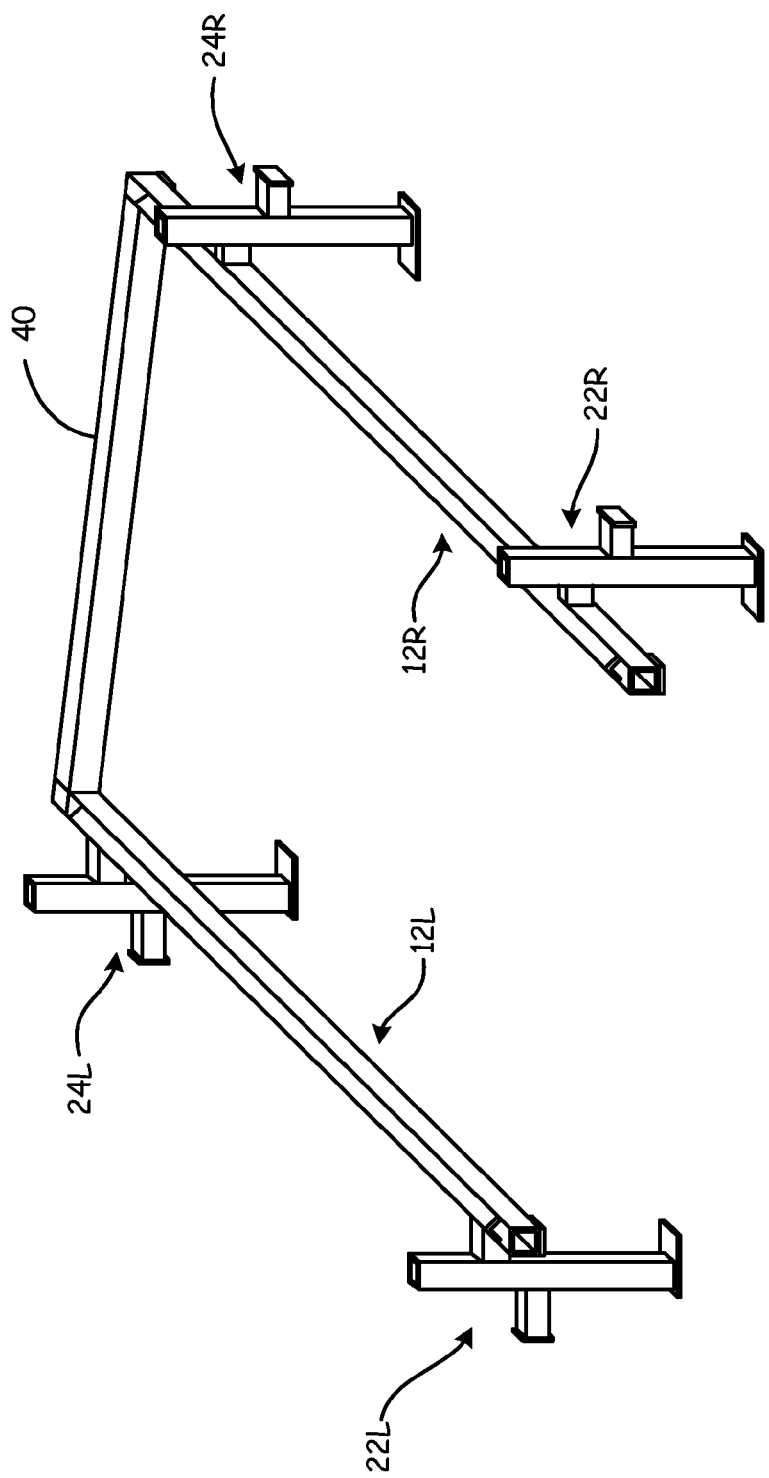
FIG. 4 is a perspective view of the rail assemblies connected by a spacing bar.

FIG. 4 is a perspective view of the left and right angular contact rail assemblies 12L, 22L and 24L and 12R, 22R, and 24R connected by spacer bar 40. Spacer bar 40 is also a box rail and is preferably connected to left rail 12L and right rail 12R by mechanical fasteners.

Figure 5:
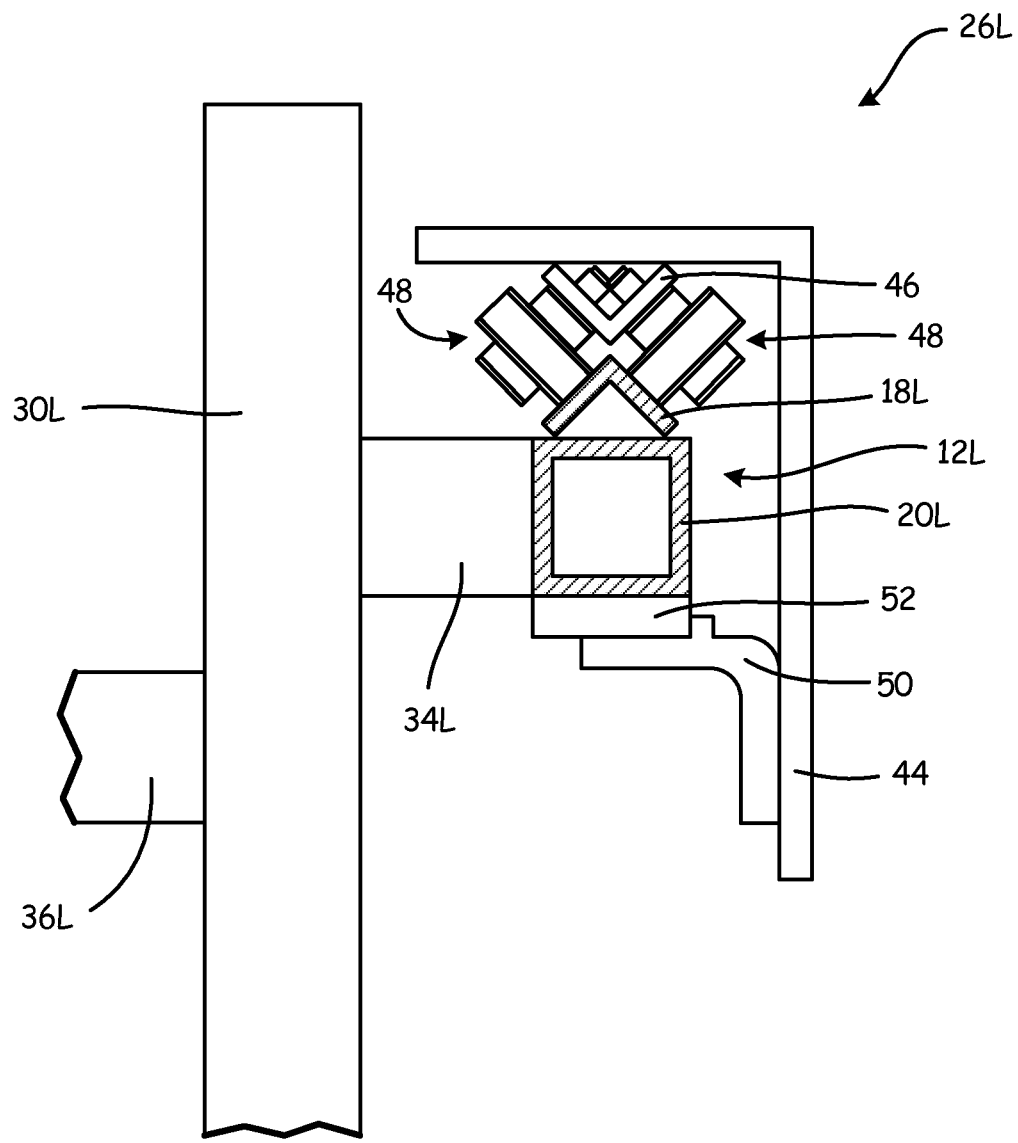
FIG. 5 is a view of a left roller bearing angular contact carrier on the rail assembly looking forward.

FIG. 1A and 1B show movable platform 14 supported on four angular contact roller bearing carriers 26L, 28L, 26R, and 28R on angular contact rails 12L and 12R. Details of the roller bearing angular contact carriers on left rail 12L are shown in FIG. 5. FIG. 5 shows an end view of angular contact carrier 26L on left rail 12L looking forward. Carrier 26L is representative of all four carriers 26L, 28L, 26R, and 28R, each of which includes similar components. FIG. 5 shows riser 30L supporting left rail 12L by rail mounting arm 34L. Riser 30L, and arms 34L, and 36L are box rails joined to each other and to box rail 20L of angle contact rail 12L preferably by welding. Angular contact carrier 26L comprises carrier bracket 44, bearing mount 46, roller bearings 48, carrier keeper 50 and low friction pad 52 (of a polymeric material such as polyoxymethylene e.g. Delrin®). Bearing mount 46 is a downward facing 90° angle rail attached to carrier bracket 44 preferably by welding. Roller bearings 48 are inserted in holes in bearing mount 46 such that the bearings are parallel to the bearing mount surface and perpendicular to upward facing 90° angle rail 18L contact surface. Low friction pad 52 is supported by carrier keeper 50 attached to carrier bracket 44. The roller bearing contact of angular contact carrier 26L on angle rail 12L allows easy travel of movable platform 10 on the rail system of the present invention.

Figure 6:
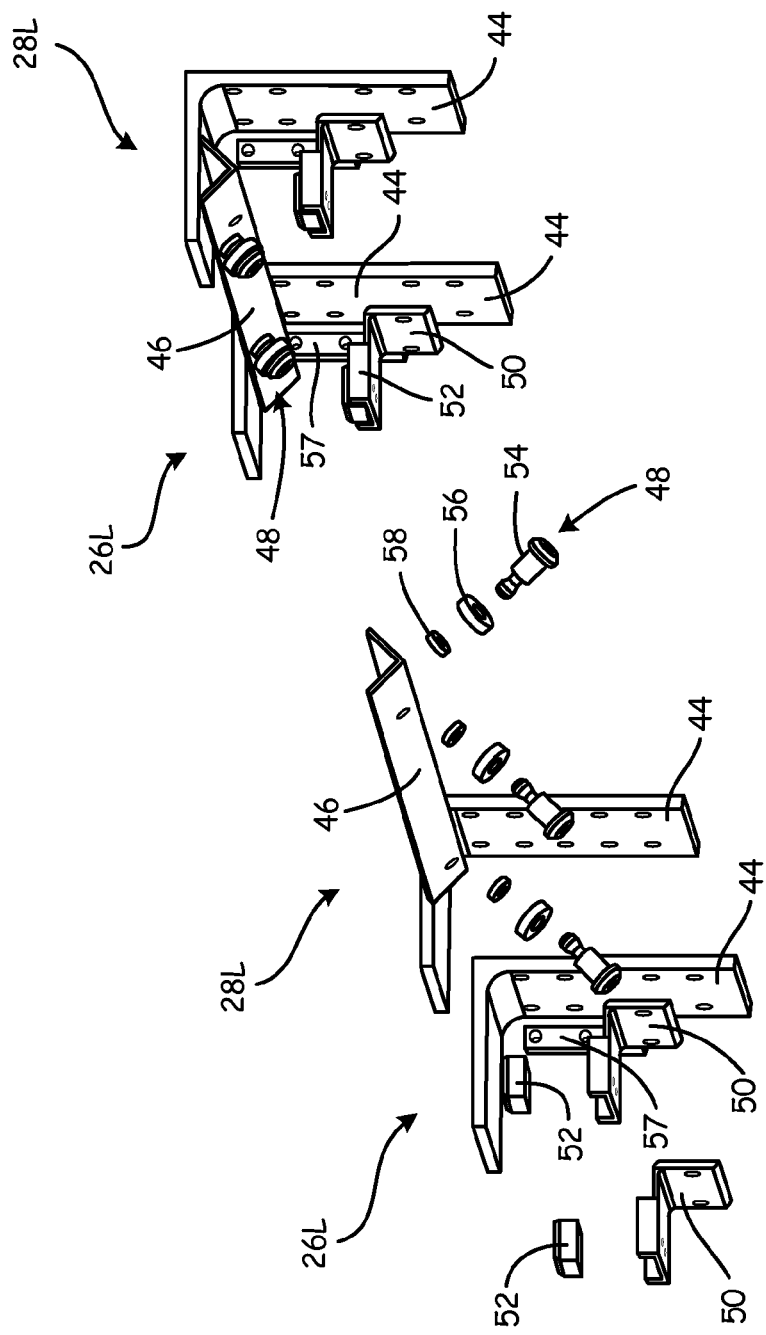
FIG. 6A and 6B are exploded and assembled views, respectively, of a left roller bearing angular contact carrier.

Exploded and assembled views respectively of driver's side angular contact carriers 26L and 28L are shown in FIGS. 6A and 6B. Details of bearing assembly 48 include shoulder bolt 54, bearing 56, and spacer 58. In FIG. 6A, three of the four roller bearing 48 assemblies are only shown for illustrative purposes. In FIG. 6B, two of the roller bearings are on the back side of bearing mount 46 and are not visible in the figure. Back plate mount 57 (described later) is attached to carrier bracket 44 preferably by welding.

Figure 7:
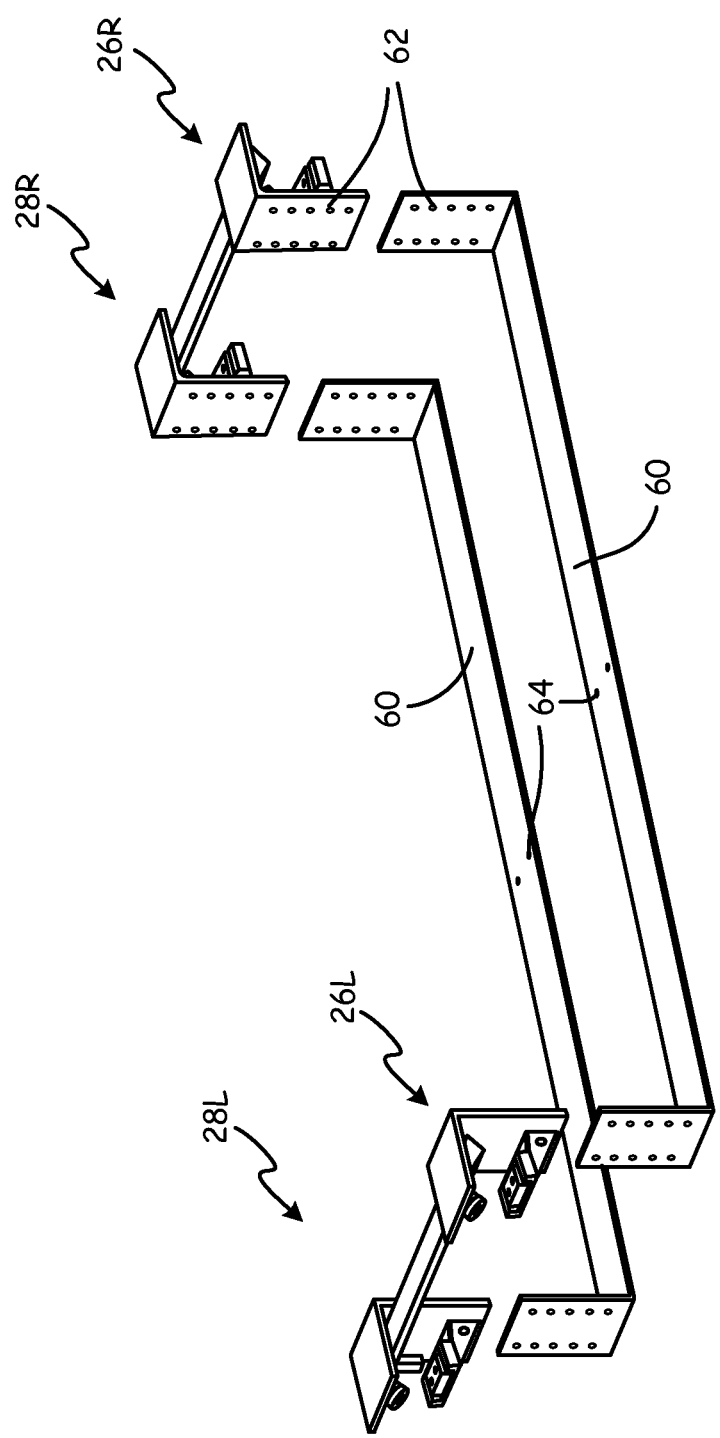
FIG. 7 is a perspective view of platform saddles and assembled roller bearing angular contact carriers.

Assembly of the platform is completed by attaching saddles 60 to angular contact carriers 26L, 28L, 26R, and 28R as shown in FIG. 7. Both the carriers and saddles have a series of adjustment holes 62 in them in order to adjust the distance of the saddles from cargo bed floor B of the truck. Mounting holes 64 are used to secure a container such as a toolbox to the platform.

Figure 8:
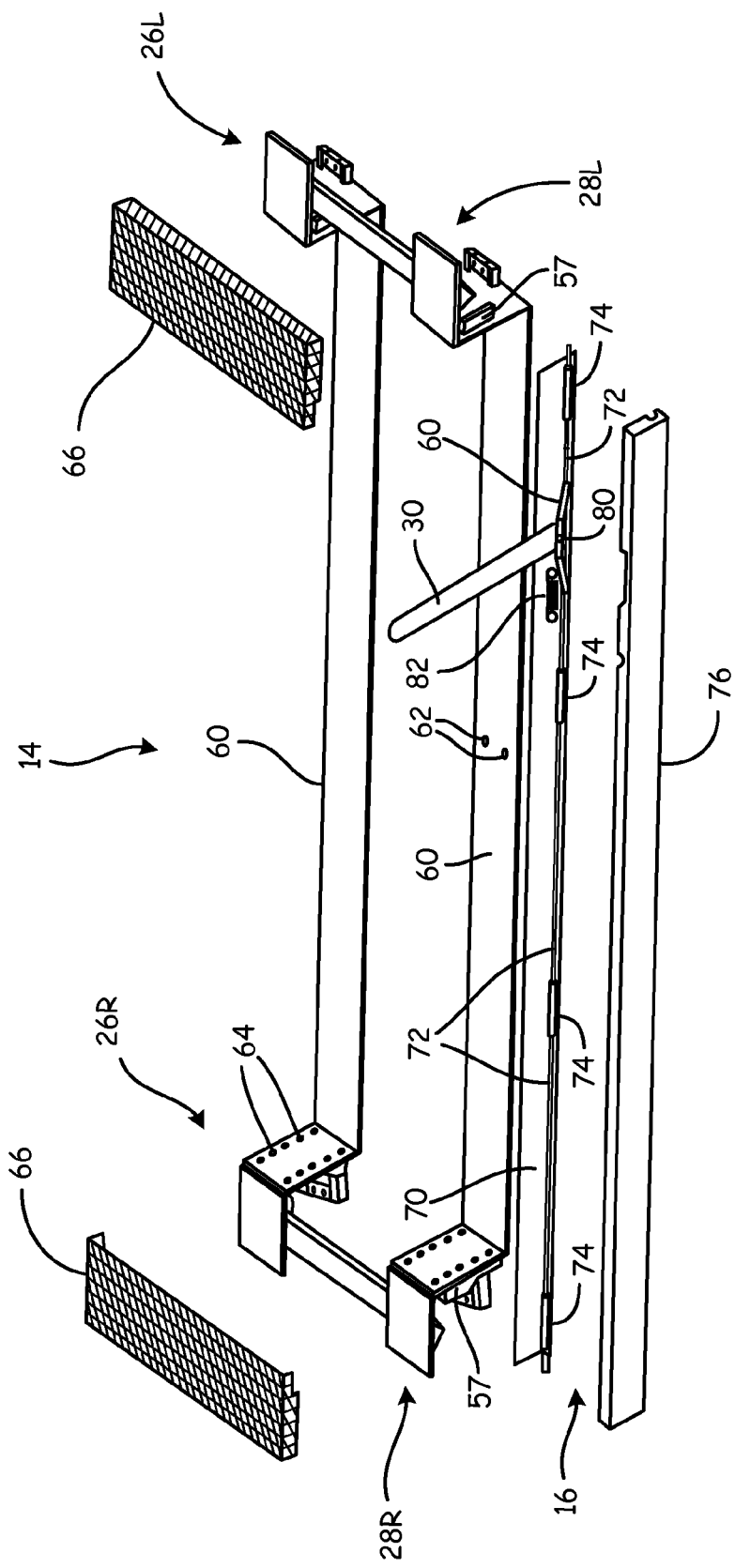
FIG. 8 is an exploded view of an assembled roller bearing angular contact carrier platform showing locking back plate and dust covers.

An exploded view of assembled angular contact carrier platform 14 showing locking black plate 16 and dust covers 66 is shown in FIG. 8. The view in FIG. 8 is from the front looking rearward so that carriers 26R and 28R appear on the left and carriers 26L and 28L appear on the right. Locking back plate 16 comprises back plate 70 bolted to back plate mounts 57 attached to angular contact carriers 28R and 28L. Locking back plate 16 comprises lockrod sections 72 in lockrod guides 74 attached to back plate 70 preferably by welding. T-handle 30 is pinned to back plate 70 by pin 80 and is attached to lockrod sections 72 such that movement of T-handle 30 will retract or advance lockrod sections 72 out of or into locking holes H in box rail sections 20L and 20R of rail assemblies 12L and 12R to release or pin movable platform 14. Back plate cover 76 is bolted to backplate 70 to cover the locking mechanism. Dust covers 66 are bolted to angular contact carrier platforms 26L, 28L and 26R, 28R to finish the assembly.

Figure 9:
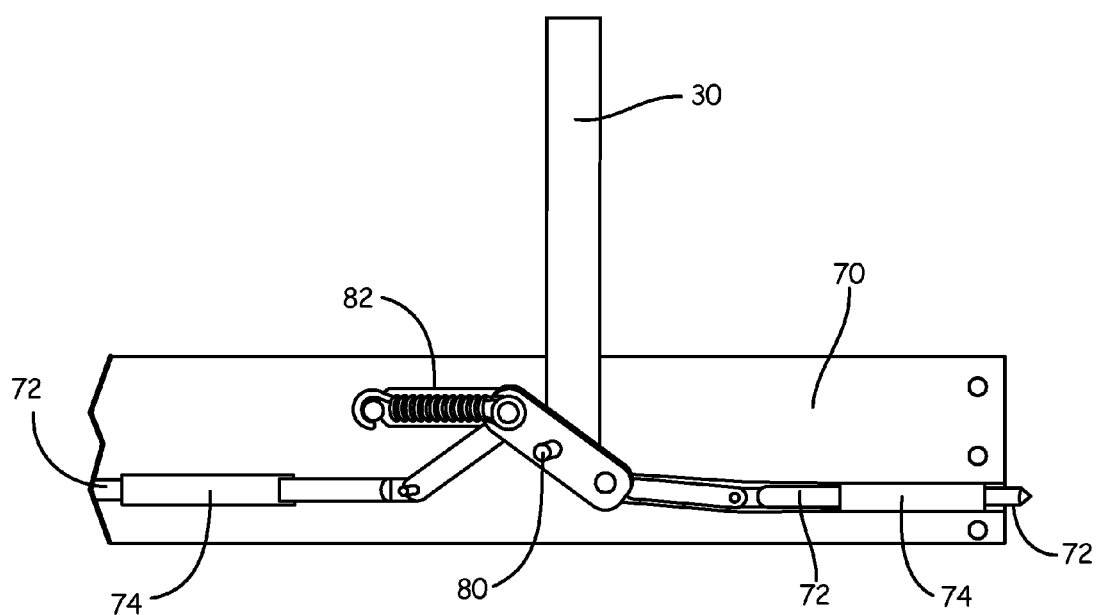
FIG. 9 is a perspective view of the locking back plate mechanism.

Details of the locking back plate mechanism are shown in FIG. 9. T-handle 30 is mounted on pin 80 in back plate 70 to allow it to retract or advance lockrods 72 riding in lockrod guides 74 to lock or free platform 14 during service. Tension spring 82 assures that T-handle 30 returns to an upright position when released. An added feature is that when T-handle 30 is pushed forward and lockrods 72 are not in locking holes H, the presence of the rods pushing against the rails acts as a brake against the motion of platform 14.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A movable platform system for a cargo bed of a pickup truck, the movable platform system comprising:
   left and right rail assemblies mountable parallel to one another in the cargo bed of the pickup truck, wherein each of the left and right rail assemblies comprise a box rail and an upward facing 90° angle rail welded to the box rail;
   a left platform support carrying a plurality of roller bearings that engage two surfaces of the left rail assembly;
   a right platform support carrying a plurality of roller bearings that engage two surfaces of the right rail assembly;
   a platform suspended from the left and right platform supports wherein the platform is slidable on the left and right rail assemblies between a forward position and a rearward position; and
   a locking mechanism connected to the left and right platform supports and configured to secure the platform in the forward position and rearward position;
   wherein each of the left and right platform supports comprises a fixture containing a bearing feature with roller bearings in contact with each upward facing surface of the angled rail, and a low friction keeper feature in contact with bottom surface of the box rail.

2. The movable platform system of claim 1, wherein each of the left and right rail assemblies further comprises a pair of risers for mounting on the cargo bed floor, a wall mounting arm extending from each riser, and a rail mounting arm that extends from each riser to the box rail.

3. The movable platform system of claim 2, wherein a floor mounting pad is attached to a bottom of each riser.

4. The movable platform system of claim 2, wherein a wall mounting arm pad is attached to an outer end of each wall mounting arm.

5. The movable platform system of claim 1, wherein the keeper feature includes a low friction polymeric pad.

6. The movable platform system of claim 1, wherein the bearing feature comprises a downward facing 90° angled rail immediately above and parallel to the upward facing 90° angled rail with roller bearings mounted on axial bolts perpendicular to and inserted into both faces of the downward facing rail such that the roller bearing surfaces are parallel to and in contact with the sides of the upward facing 90° angled rail allowing slidable motion of the roller bearing assembly along an upward facing rail.

7. The movable platform system of claim 1, wherein the locking mechanism comprises spring loaded lockrods and lockrod guides attached to a back plate on the platform and capable of insertion into holes in the box rails.

8. The movable platform system of claim 7, wherein the locking mechanism further comprises a T-bar to actuate the lockrods.

9. The movable platform system of claim 1, wherein the distance from a bottom of the platform to a floor of the pickup bed is adjustable through connections between the platform and the left and right platform supports.

10. The movable platform system of claim 1, wherein the two surfaces of the first rail assembly engaged by the roller bearings are adjacent to one another, and wherein the two surfaces of the second rail assembly engaged by the roller bearings are adjacent one another.

11. The movable platform system of claim 1, wherein the platform comprises left and right saddles connected between the left and right platform supports.

12. The movable platform system of claim 1, wherein the locking mechanism comprises retractable lock rods for engaging locking holes in the left and right rail assemblies.

13. A movable platform system for a cargo bed of a pickup truck, the movable platform system comprising:
- left and right rail assemblies mountable parallel to one another in the cargo bed of the pickup truck, wherein each of the left and right rail assemblies comprise a box rail, an upward facing 90° angled rail welded to the box rail, a pair of risers for mounting on the cargo bed floor, a wall mounting arm extending from each riser, and a rail mounting arm that extends from each riser to the box rail;
- a left platform support carrying a plurality of roller bearings that engage two surfaces of the left rail assembly;
- a right platform support carrying a plurality of roller bearings that engage two surfaces of the right rail assembly; and
- a platform suspended from the left and right platform supports wherein the platform is slidable on the left and right rail assemblies between a forward position and a rearward position;
- wherein each of the left and right platform supports comprises a fixture containing a bearing feature with roller bearings in contact with each upward facing surface of the angled rail, and a low friction keeper feature in contact with bottom surface of the box rail.

14. The movable platform system of claim 13, wherein a floor mounting pad is attached to a bottom of each riser.

15. The movable platform system of claim 13, wherein a wall mounting arm pad is attached to an outer end of each wall mounting arm.

16. The movable platform system of claim 13, wherein the bearing feature comprises a downward facing 90° angled rail immediately above and parallel to the upward facing 90° angled rail with roller bearings mounted on axial bolts perpendicular to and inserted into both faces of the downward facing rail such that the roller bearing surfaces are parallel to and in contact with the sides of the upward facing 90° angled rail allowing slidable motion of the roller bearing assembly along an upward facing rail.

17. The movable platform system of claim 13, and further comprising a locking mechanism connected to the platform supports and configured to secure the platform in the forward position and rearward position, wherein the locking mechanism comprises spring loaded lockrods and lockrod guides attached to a back plate on the platform and capable of insertion into holes in the box rails.

18. The movable platform system of claim 17, wherein the locking mechanism further comprises a T-bar to actuate the lockrods.

19. The movable platform system of claim 13, wherein the platform comprises left and right saddles connected between the left and right platform supports.

20. A movable platform system for a cargo bed of a pickup truck, the movable platform system comprising:
- left and right rail assemblies mountable parallel to one another in the cargo bed of the pickup truck, wherein each of the left and right rail assemblies comprise a box rail, and an upward facing 90° angled rail welded to the box rail;
- a left platform support carrying a plurality of roller bearings that engage two surfaces of the angled rail of the left rail assembly;
- a right platform support carrying a plurality of roller bearings that engage two surfaces of the angled rail of the right rail assembly;
- a platform suspended from the left and right platform supports wherein the platform is slidable on the left and right rail assemblies between a forward position and a rearward position; and
- a locking mechanism connected to the platform support and configured to secure the platform in the forward position and rearward position;
- wherein each of the left and right platform supports includes a downward facing 90° angled rail immediately above and parallel to one of the upward facing 90° angled rails with roller bearings mounted on axial bolts perpendicular to and inserted into both faces of the downward facing rail such that the roller bearing surfaces are parallel to and in contact with the surfaces of the upward facing 90° angled rail allowing slidable motion of the left and right platform supports along the upward facing 90° angled rails.

\* \* \* \* \*